US012394913B1

(12) United States Patent
Strassner

(10) Patent No.: US 12,394,913 B1
(45) Date of Patent: Aug. 19, 2025

(54) PLANAR DUAL-POLARIZATION ANTENNA

(71) Applicant: National Technology & Engineering Solutions of Sandia, LLC, Albuquerque, NM (US)

(72) Inventor: Bernd H. Strassner, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 835 days.

(21) Appl. No.: 17/552,707

(22) Filed: Dec. 16, 2021

(51) Int. Cl.
*H01Q 21/24* (2006.01)
*H01Q 1/48* (2006.01)
*H01Q 9/04* (2006.01)

(52) U.S. Cl.
CPC ............... *H01Q 21/24* (2013.01); *H01Q 1/48* (2013.01); *H01Q 9/0457* (2013.01)

(58) Field of Classification Search
CPC ......... H01Q 21/24; H01Q 1/48; H01Q 9/0457
See application file for complete search history.

(56) References Cited

U.S. PATENT DOCUMENTS

| | | | | |
|---|---|---|---|---|
| 2013/0063310 A1* | 3/2013 | Mak | H01Q 1/246 343/700 MS | |
| 2017/0054217 A1* | 2/2017 | Hashimoto | H01Q 9/0457 | |

OTHER PUBLICATIONS

Cheng, et al., "Design of a Fractal Dual-Polarized Aperture Coupled Microstrip Antenna", In Progess in Electromagnetics Research Letters, vol. 9, 2009, pp. 175-181.
Gao, et al., "Low-Cost Dual-Polarized Printed Array With Broad Bandwidth", In IEEE Transactions on Antennas and Propagation, vol. 52, No. 12, Dec. 2004, pp. 3394-3397.
Karimkashi, et al., "A Dual-Polarized Series-Fed Microstrip Antenna Array With Very High Polarization Purity for Weather Measurements", In IEEE Transactions on Antennas and Propagation, vol. 61, No. 10, Oct. 2013, pp. 5315-5319.
Zhu, et al., "Broadband and Dual Circularly Polarized Patch Antenna with H-shaped Aperture", In Proceedings of ISAP 2014, Dec. 2-5, 2014, pp. 549-550.

* cited by examiner

*Primary Examiner* — David E Lotter
(74) *Attorney, Agent, or Firm* — Mark A. Dodd; Merle W. Richman

(57) ABSTRACT

An antenna includes a first dielectric layer and a second dielectric layer. The first dielectric layer has a first ground plane formed thereon. A stripline conductor is formed on a first side of the second dielectric layer. The second dielectric layer is positioned such that the stripline conductor is positioned between the first dielectric layer and the second dielectric layer. A second ground plane is formed on a second side of the second dielectric layer. The second ground plane has a slot formed therein; the slot aligned with the stripline conductor such that signals propagating along the stripline conductor couple to the slot. The antenna further includes a patch radiating element disposed above the slot such that signals that couple to the slot subsequently couple to the patch radiating element and are radiated outward.

11 Claims, 5 Drawing Sheets

PLANAR DUAL-POLARIZATION ANTENNA

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Planar antenna arrays are useful for various applications in which a compact form factor is desirable, particularly when employed on airborne or seaborne platforms. Furthermore, antennas and antenna arrays capable of transmitting dual-polarized signals can provide improved performance in determining the size and shapes of targets when incorporated in a radar system as compared to single-polarized radar systems.

Various dual-polarized radiating elements exhibiting wideband performance have been proposed. Some of these elements are unsuitable for use in a planar antenna array that can be mounted on a flat surface because they rely on microstrip transmission lines that would be shorted or made lossy when mounted on a surface. Other dual-polarized radiating elements incorporate air gaps to accomplish wideband performance, using either standoffs or foam-based layers. These radiating elements are difficult to reliably incorporate in an array of antennas due to variations in thickness of radiating elements across the array. Other radiating elements use multiple radiating patches to establish resonances that yield wideband performance. However, these elements require additional substrate layers to separate the patches from one another, creating difficulties in registration among multiple layers as the scale of an array formed from such elements increases.

SUMMARY

The following is a brief summary of subject matter that is described in greater detail herein. This summary is not intended to be limiting as to the scope of the claims.

Various technologies pertaining to a dual-polarization planar antenna array are described herein. With more particularity, technologies for a dual-polarization antenna element that does not incorporate an air gap layer are described herein. In an exemplary embodiment, an antenna includes a first ground plane, a first solid dielectric layer, a stripline conductor, a second solid dielectric layer, a second ground plane, a third solid dielectric layer, and a radiating patch element. The first ground plane can be a substantially solid layer that isolates the antenna from electromagnetic interference originating from the direction of a surface on which the antenna is mounted. The first dielectric layer is positioned above the first ground plane. In some embodiments, the first ground plane is deposited as a metallization layer on a bottom side of the first dielectric layer. The stripline conductor is positioned above the first dielectric layer. The second dielectric layer is positioned above the stripline conductor such that the stripline conductor is sandwiched between the first dielectric layer and the second dielectric layer. The second ground plane is positioned above the second dielectric layer (e.g., as a metallization layer on the second dielectric layer). The second ground plane has a slot formed therein; the slot positioned above the stripline conductor such that energy couples from the stripline conductor to the slot. The third dielectric layer is positioned above the second ground plane. A radiating patch element is positioned above the third dielectric layer such that the third dielectric layer separates the radiating patch element from the second ground plane. The radiating patch element is aligned with the slot in the second ground plane, such that energy couples from the slot to the radiating patch element.

Unlike conventional stripline conductors, which are generally surrounded by dielectric layers of equal thickness, the first dielectric layer has a first thickness that is greater than a second thickness of the second dielectric layer. The second dielectric layer can be configured to have a thickness that facilitates coupling between the stripline conductor and the slot in the second ground plane. The first dielectric layer is configured to have a thickness that is sufficiently great that the first ground plane does not inhibit coupling of energy between the stripline conductor and the slot in the second ground plane. Thus, the first ground plane can provide electromagnetic isolation between the stripline conductor and a surface that the antenna element is mounted on without inhibiting coupling of energy from the stripline conductor to the slot in the second ground plane and on to the radiating patch element.

The antenna can further be configured to include a second stripline conductor formed on a same layer as the first stripline conductor, and a second slot in the same second ground plane in which the first slot is formed. The second stripline and the second slot are aligned such that energy couples from the second stripline into the second slot. The second slot is further positioned such that energy couples from the second slot to the same patch radiating element that receives energy from the first slot. The antenna can be configured to receive input signals with a linear horizontal polarization by way of the first stripline and to receive input signals with a linear vertical polarization by way of the second stripline. The antenna radiates both the horizontal polarization signals and the vertical polarization signals. Hence, the antenna can be configured as a dual-polarization antenna.

The dual-polarization antenna described above can be included in an array of similarly configured antennas that are constructed on common substrates. For example, the stripline conductors of the antennas can be sandwiched between same first and second dielectric layers, slots of the antennas can be formed in a common ground plane, patch radiating elements of the antennas can be formed in a common plane, etc. In various embodiments, the stripline conductors of the antennas can be fed by common feed networks that are configured to deliver different amounts of power to different antennas depending upon their position in the array. The feed networks can be staged branching feed networks, wherein each subsequent stage of the feed network has twice as many traces as a preceding stage of the feed network.

The feed networks can each be configured to deliver input signals to the antennas of the array for each of two orthogonal polarizations. For example, the antenna array can include a first feed network that is configured to provide linear horizontal polarized input signals to first stripline conductors of the antennas. Continuing the example, the antenna array can include a second feed network that is configured to provide linear vertical polarized input signals to second stripline conductors of the antennas.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1A:
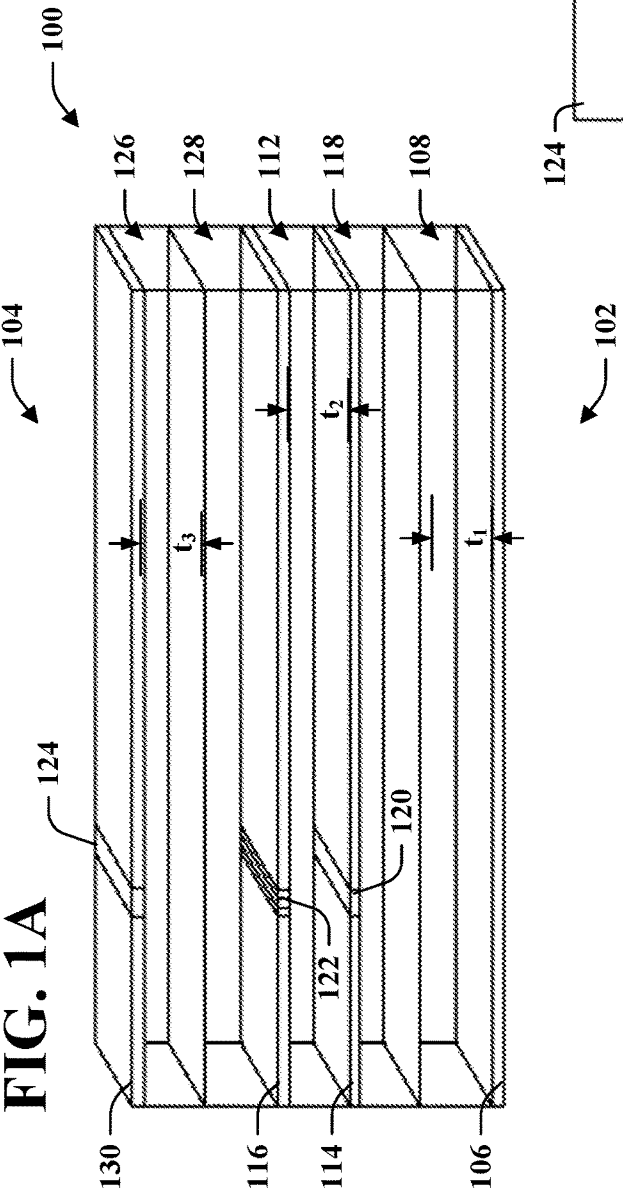
FIG. 1A is a perspective cross-sectional view of an exemplary antenna.

Various technologies pertaining to a dual-polarization antenna are now described with reference to the drawings, wherein like reference numerals are used to refer to like elements throughout. With more specificity, a dual-polarization antenna is described herein that is suitable for use in a planar, dual-polarization antenna array. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

Figure 1B:
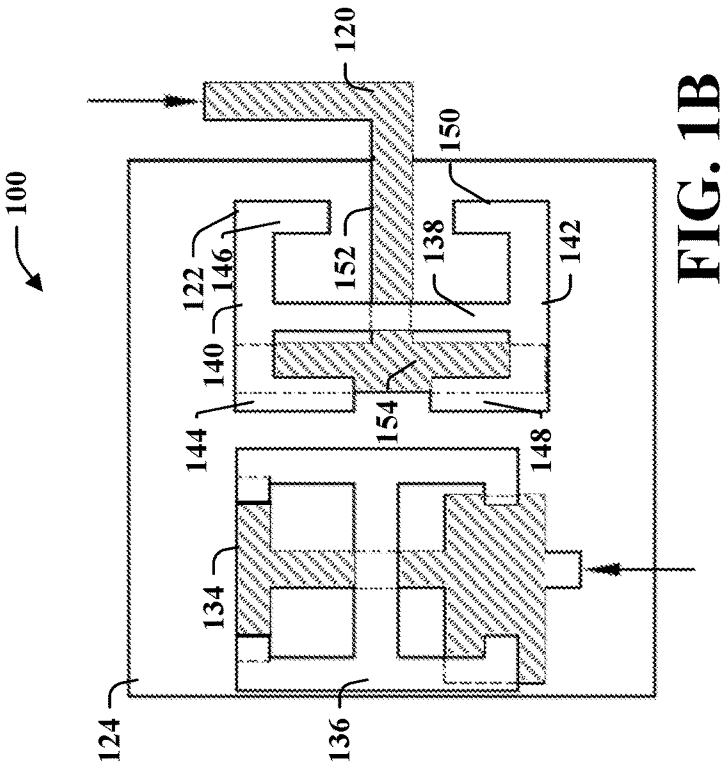
FIG. 1B is a top-down view of the exemplary antenna depicted in FIG. 1A.

With reference to FIGS. 1A and 1B, an exemplary dual-polarization antenna 100 suitable for wideband operation is illustrated. FIG. 1A depicts a cross-sectional perspective view of the antenna 100. FIG. 1B is a top-down partial-transparency view of the antenna 100. Referring now solely to FIG. 1A, a plurality of layers of the antenna 100 are shown. The antenna 100 has a bottom side 102 and a top side 104, wherein the antenna 100 is configured such that signals input to the antenna 100 are radiated outward from the top side 104 of the antenna 100. For the sake of clarity, as used herein in reference to FIGS. 1A and 1B, relative terms such as "above" and "below" consider the top side 104 of the antenna 100 as being above the bottom side 102 of the antenna 100. However, it is to be understood that in practical application, the top side 104 of the antenna 100 could be positioned below the bottom side 102 of the antenna 100. For instance, if the antenna 100 is employed in a ground-pointed radar mounted on an aircraft, the top side 104 of the antenna 100 may be positioned closer to the ground than the bottom side 102 of the antenna.

The antenna 100 includes a first ground plane 106 that forms the bottom side 102 of the antenna 100. The antenna 100 further includes a solid first dielectric layer 108 positioned above the ground plane 106. The first dielectric layer 108 can be a substrate material on which various additional materials, such as metallization layers, can be printed or otherwise deposited. By way of example, and not limitation, the first dielectric layer 108 comprises a laminate material such as a PTFE composite reinforced by glass microfibers. The first ground plane 106 can be deposited on the first dielectric layer 108 as a metallization layer. The first ground plane 106 can be a layer of copper or other conductive material formed on a bottom side of the first dielectric layer 108.

The antenna 100 further includes a solid second dielectric layer 112 that is positioned above the first dielectric layer 108. Like the first dielectric layer 108, the second dielectric layer 112 can be formed from a substrate material on which various additional materials can be printed or deposited. The second dielectric layer 112 has a bottom-side metallization layer 114 and a top-side metallization layer 116. An adhesive layer 118 can be positioned between the first dielectric layer 108 and the second dielectric layer 112 (e.g., between and in contact with the metallization layers 114). The adhesive layer 118 holds the dielectric layers 108, 112 and their associated metallization layers 106, 114, 116 in a fixed relative position.

The bottom-side metallization layer 114 includes a stripline conductor 120. The stripline conductor 120 is a strip of metal that can conduct signals that are input to the antenna 100 (e.g., by way of a feed network, as will be described in greater detail below). The stripline conductor 120 is sandwiched between the first dielectric layer 108 and the second dielectric layer 112. The top-side metallization layer 116 is a substantially continuous, solid conductive layer such that the top-side metallization layer 116 forms a second ground plane. Thus, the stripline conductor 120 is surrounded by the dielectric materials of the dielectric layers 108, 112 and positioned between a first ground plane 106 and a second ground plane 116. The stripline conductor 120 is therefore configured to function as a planar transmission line.

The first ground plane 106 functions to isolate the stripline conductor 120 from electrical interference originating from an interference source located on the opposite side of the ground plane 106 from the stripline conductor 120 (i.e., the bottom side 102 of the antenna 100). If the stripline conductor 120 is positioned too close to the first ground plane 106, the first ground plane 106 can adversely affect propagation of an input signal along the stripline conductor 120. The first dielectric layer 108 has a thickness that is sufficiently large to prevent the first ground plane 106 from interfering with propagation of signals along the stripline conductor 120. In exemplary embodiments, the first dielectric layer 108 has a thickness, $t_1$ defined by the following inequality:

$$t_1 \geq (0.13\lambda \div \sqrt{\varepsilon_{r1}}), \quad \text{(Eq. 1)}$$

where $\lambda$ is the free-space wavelength of the center frequency of a signal desirably transmitted by the antenna 100 and $\varepsilon_{r1}$ is the relative permittivity, or dielectric constant, of the first dielectric layer 108. In a specific example, the first dielectric layer 108 can have a thickness $t_1$ of 59-65 mil, inclusive, (e.g., 62 mil) in embodiments wherein the antenna 100 is configured to transmit a signal having a center frequency of 16.7 GHz, within the Ku-band. In various embodiments, the first dielectric layer 108 has a dielectric constant $\varepsilon_{r1}$ of approximately 2.2. It is to be understood that the antenna 100 can be configured to transmit signals within other bands (e.g., the K band, the Ka band, or the X band) at different center frequencies in part by appropriate selection of the thickness $t_1$ of the first dielectric layer 108 (e.g., according to Eq. 1).

The top-side metallization layer 116, positioned on the second dielectric layer 112, has a slot 122 formed therein. The slot 122 is positioned above and aligned with the stripline conductor 120 such that energy transmitted along the stripline conductor 120 couples to the slot 122. As will be described in greater detail below, signals that are coupled into the slot 122 by transmission through the stripline conductor 120 are ultimately coupled to a patch radiating element for radiation by the antenna 100.

The second dielectric layer 112 is configured to be sufficiently thin so that energy transmitted along the stripline conductor 120 efficiently couples to the slot 122. The second dielectric layer 112 has a second thickness, $t_2$, that is less than the thickness $t_1$ of the first dielectric layer 108. In exemplary embodiments, the thickness $t_2$ of the second dielectric layer 112 can be defined by:

$$t_2=(0.042\lambda\div\sqrt{\varepsilon_{r2}})\pm 5\%, \quad \text{(Eq. 2)}$$

where $\varepsilon_{r2}$ is the relative permittivity of the second dielectric layer 112. In a specific example, the second dielectric layer 112 can have a thickness $t_2$ of 19-21 mil, inclusive, (e.g., 20 mil) in embodiments wherein the antenna 100 is configured to transmit a signal having a center frequency of 16.7 GHz. In such embodiments, the dielectric constant $\varepsilon_{r2}$ of the second dielectric layer 112 can be about 2.2. It is again to be understood that the antenna 100 can be configured to transmit signals within other bands at different center frequencies in part by appropriate selection of the thickness $t_2$ of the second dielectric layer 112 (e.g., according to Eq. 2).

As noted above, the antenna 100 further includes a patch radiating element 124 that is aligned with the slot 122. The patch radiating element 124 is configured such that signals coupled into the slot 122 by way of the stripline conductor 120 are in turn coupled to the patch radiating element 124 from the slot 122. Thus, signals transmitted along the stripline conductor 120 are radiated by way of the patch radiating element 124. In exemplary embodiments, the patch radiating element 124 is a rectangular patch radiator. However, it is to be understood that the patch radiating element 124 can have any of various other geometries.

The antenna 100 is constructed such that the antenna 100 can emit wideband signals. In non-limiting exemplary embodiments, a signal emitted by the patch radiating element 124 can have a fractional bandwidth of greater than or equal to 10%, greater than or equal to 15%, or greater than or equal to 20%.

To support the patch radiating element 124, the antenna 100 includes a third dielectric layer 126. The third dielectric layer 126 can be adhered to the second dielectric layer 112 by way of a second adhesive layer 128 that is disposed between the second dielectric layer 112 and the third dielectric layer 126. The third dielectric layer 126 can include a top-side metallization layer 130. The patch radiating element 124 can be formed on the top-side metallization layer 130. A thickness, $t_3$, of the third dielectric layer 126 can be selected to facilitate efficient coupling between the slot 122 and the patch radiating element 124. In an exemplary embodiment, the thickness $t_3$ of the third dielectric layer 126 is selected to be a same thickness as the first dielectric layer 108. In other embodiments, the thickness $t_3$ of the third dielectric layer 126 can be selected according to the following equation:

$$t_3=(0.13\lambda\div\sqrt{\varepsilon_{r3}})\pm 5\%, \quad \text{(Eq. 3)}$$

where $\varepsilon_{r3}$ is the relative permittivity of the third dielectric layer 126.

The stripline conductor 120 and the slot 122 are formed on opposite sides of a same substrate, the second dielectric layer 112. The stripline conductor 120 and the slot 122 can be accurately registered to one another by way of registration techniques that have been developed for alignment of features on printed circuit boards (PCBs). These techniques can provide greater alignment accuracy than techniques that require physically separate layers to be aligned and then bonded to one another. As shown in FIG. 1A, in various embodiments the exemplary antenna 100 can formed from only three laminate layers 108, 112, 126 joined by adhesives 118, 128. The first dielectric layer 108 can be configured to support only the first ground plane 106 so that close alignment between the first dielectric layer 108 and the other layers 112, 126 may be unnecessary. The antenna 100 can therefore be constructed by comparatively simple alignment between the second dielectric layer 112 that supports the stripline conductor 120 and the slot 122 and the third dielectric layer 126 that supports the patch radiating element 124. Such two-layer alignment can be accomplished more simply than alignment of a greater number of layers.

The antenna 100 can be configured for dual-polarization operation by inclusion of an additional stripline conductor in the bottom-side metallization layer 114 and a corresponding additional slot in the top-side metallization layer 116. Referring now to FIG. 1B, a top-down view of the antenna 100 is shown. FIG. 1B illustrates aligned placement of the stripline conductor 120 and the slot 122. FIG. 1B further illustrates a second stripline conductor 134 and a second slot 136 that is aligned with the second stripline conductor 134. The antenna 100 can be configured such that the first stripline conductor 120 receives a first input signal having a linear horizontal polarization and the second stripline conductor 134 receives a second input signal having a linear vertical polarization. The second stripline conductor 134 can be included in the same metallization layer 114 as the first stripline conductor 120. Similarly, the second slot 136 can be included in the same metallization layer 116 as the first slot 122.

As shown in FIG. 1B, the slots 122, 136 can be configured as H-shaped slots. For example, the slot 122 has a first straight portion 138, a second straight portion 140 positioned at a first end of the first straight portion 138, and a third straight portion 142 positioned at a second end of the first straight portion 138 opposite the first end. The second straight portion 140 and the third straight portion 142 are perpendicular to the first straight portion 138 and parallel with one another. The slots 122, 136 can further include tuning features that are configured to increase the fractional bandwidth of signals radiated by the antenna 100. For example, the slot 122 can include additional straight portions 144-150 that each extend from one of the second straight portion 140 or the third straight portion 142 inward toward the other of the second straight portion 140 or the third straight portion 142. These straight portions 144-150 serve as tuning features, the lengths and widths of which can be selected to increase the fractional bandwidth of signals radiated by the antenna 100 (e.g., as compared with a similarly configured antenna that does not include these portions 144-150).

The geometry and alignment of the slots 122, 136 are configured to facilitate coupling of signals propagating along the stripline conductors 120, 134 into the slots 122, 136. For example, the stripline conductors 120, 134 can be configured to cross under the slots 122, 136, respectively, such that signals propagating along the stripline conductors 120, 134 couple into the slots 122, 136. In exemplary embodiments, the stripline conductors 120, 134 are configured to cross under the slots 122, 136 such that a linear portion of each of the conductors 120, 134 crosses under a perpendicular linear portion of its corresponding slot 122, 136. For example, the stripline conductor 120 can include a first linear portion 152. The first linear portion 152 of the stripline conductor 120 extends under the first straight portion 138 of the slot 122 such that, if the stripline conductor 120 were coplanar with the slot 122, the stripline conductor 120 and the slot 122 would be perpendicular with one another.

The stripline conductors 120, 134 can also include tuning features designed to increase the fractional bandwidth of signals radiated by the antenna 100. For instance, the stripline conductor 120 can further include a second linear portion 154 that is perpendicular with the first linear portion 152 of the stripline conductor 120. The second linear portion 154 extends below each of the second straight portion 140 and the third straight portion 142 of the slot 122. The second linear portion 154 can further extend at least partially below the additional straight portions 144, 148 of the slot 122, thereby further facilitating coupling between the stripline conductor 120 and the slot 122.

While the slots 122, 136 have been described herein as having an H-shaped configuration and various tuning features, it is to be understood that the slots 122, 136 can instead be configured as linear slots each consisting of a single straight portion. For example, in some embodiments the slot 122 can consist of the first straight portion 138. Similarly, the stripline conductors 120, 134 can be configured as substantially linear elements. For instance, in some embodiments the stripline conductor 120 can consist of the first linear portion 152. In various embodiments, the patch radiating element 124 can be configured to cover the entirety of the slots 122, 136.

The antenna 100 can be employed in an array of similarly configured antennas that can all be formed on a common set of layers. By way of example, a plurality of antennas configured in accordance with the antenna 100 can have stripline conductors formed on the same metallization layer 114 as the stripline conductor 120, slots formed on the same metallization layer 116 as the slot 122, and patch radiating elements formed on the same metallization layer 130.

Figure 2:
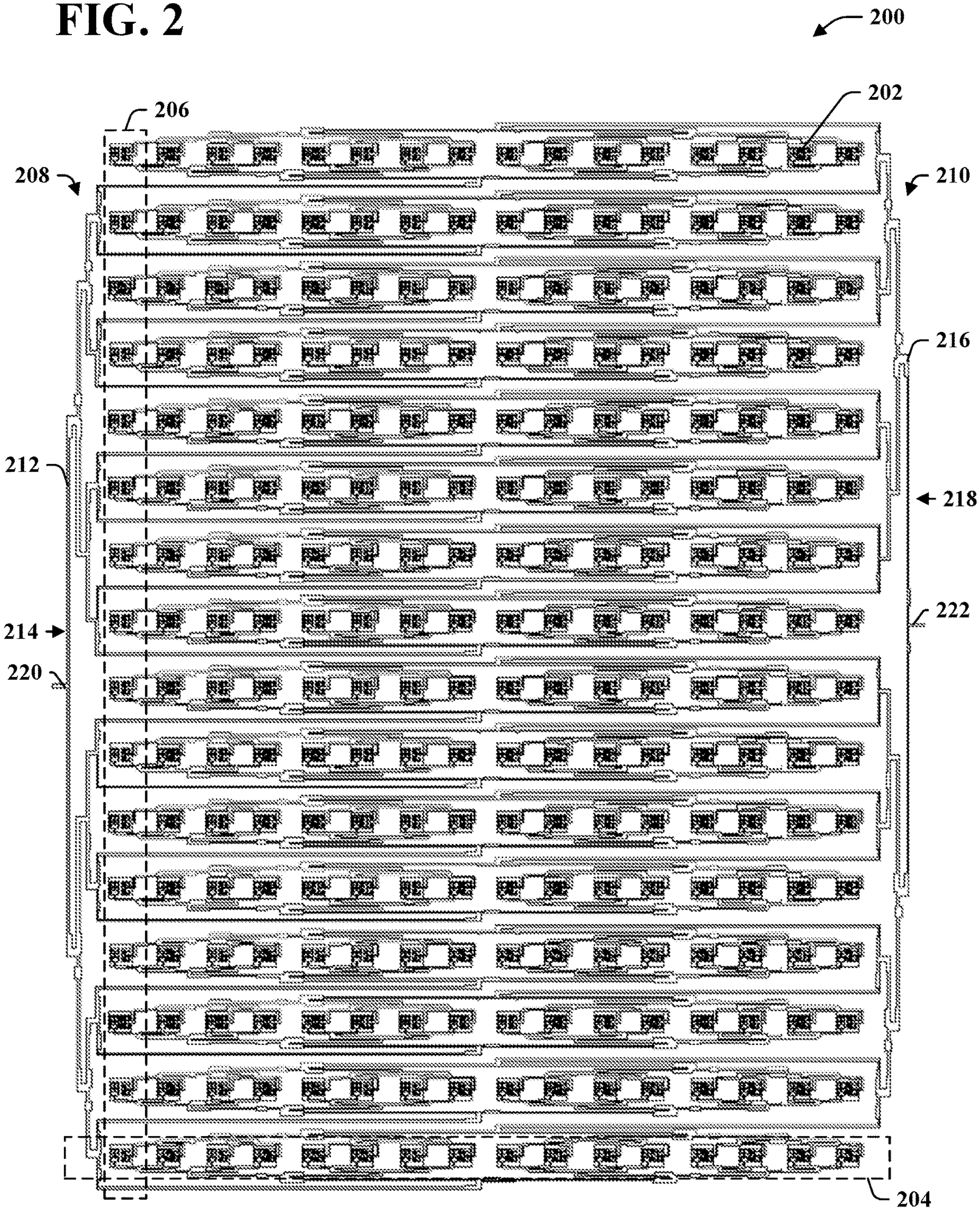
FIG. 2 is a top-down view of an exemplary antenna array.

Referring now to FIG. 2, an exemplary antenna array 200 is shown, wherein the array comprises a plurality of antennas (e.g., an antenna 202) that are configured for wideband dual-polarization operation in a manner similar to the antenna 100 as shown in FIG. 1B. The antennas of the array 200 are arranged in a rectangular configuration of rows (e.g., row 204) and columns (e.g., column 206). The exemplary array 200 includes 256 antennas arranged in 16 columns and 16 rows. However, it is to be understood that an array of antennas configured in accordance with embodiments of a dual-polarization antenna described herein can have substantially any number of elements.

Each of the antennas of the array 200 includes a first input port and a second input port. In dual-polarization operation of the array 200, first signals having a first polarization are input to the antennas by way of the first input ports of the antennas. Second signals having a second polarization are input to the antennas of the array 200 by way of the second input ports. The array 200 comprises a first feed network 208 that is configured to provide the first signals to the first input ports and a second feed network 210 that is configured to provide the second signals to the second input ports. In other words, each of the antennas of the array 200 receives separate input from each of the feed networks 208, 210, with the first feed network 208 providing signals having a first polarization, and the second feed network 210 providing signals having a second polarization. The antennas of the array 200 are configured to radiate both the signals having the first polarization and the signals having the second polarization. The first feed network 208 and the second feed network 210 can be disposed in a same metallization layer as the stripline conductors of the antennas of the array 200 (e.g., the metallization layer 114 of the antenna 100).

Each of the feed networks 208, 210 comprises a plurality of m row feed networks, where m is a positive integer, and a row-combining feed network. Stated differently, each of the feed networks 208, 210 includes a sub-feed network that is configured to receive an array input signal and to distribute row input signals to each of the rows of the array 200, and a plurality of additional sub-feed networks that are each configured to receive a respective row input signal and distribute that row input signal across the antennas of its corresponding row.

Figure 3A:
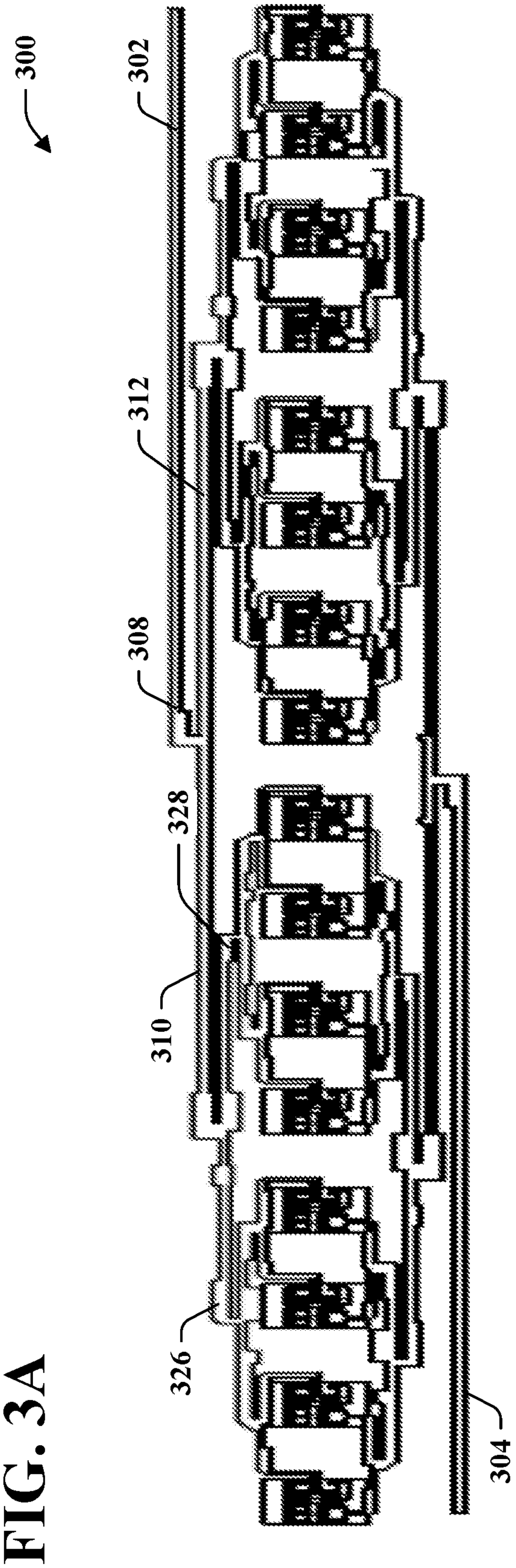
FIG. 3A is a view of an exemplary row feed network.
Figure 3B:
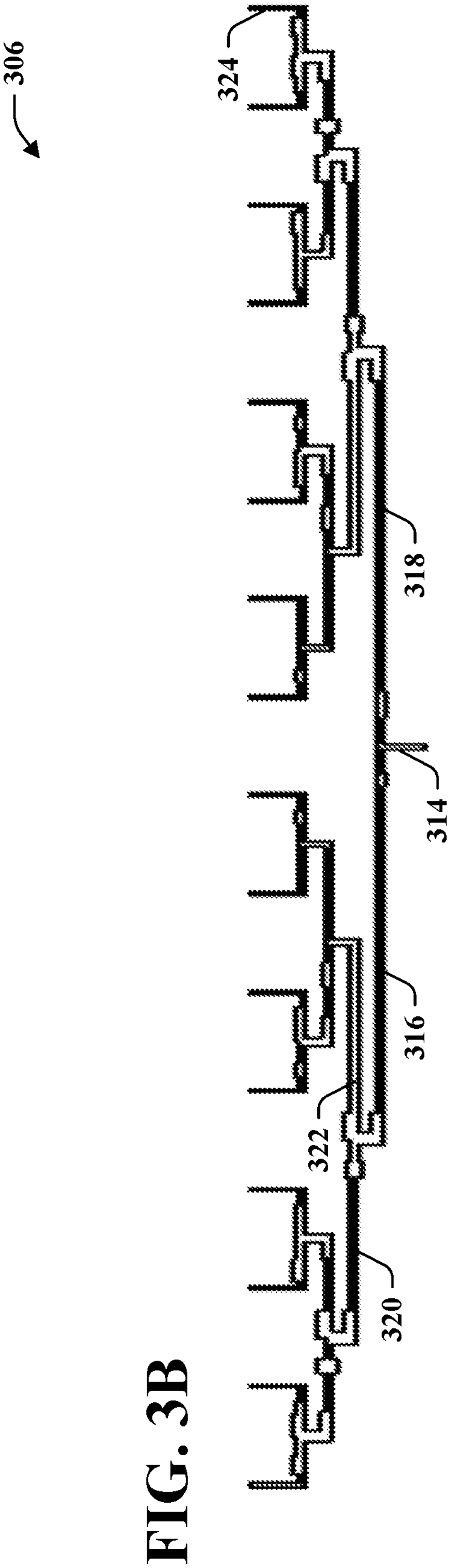
FIG. 3B is a view of an exemplary row-combining feed network.

Referring now to FIG. 3A, a row 300 of the antenna array 200 is shown, wherein the row 300 is fed by a first row feed network 302 (e.g., part of the first feed network 208) configured to carry input signals having a first polarization, and further fed by a second row feed network 304 (e.g., part of the second feed network 210) that is configured to carry input signals having a second polarization. Referring now to FIG. 3B, a row-combining feed network 306 that is configured to distribute an array input signal to the rows of the array 200 is shown. Collectively, the first row feed network 302 and the row-combining feed network 306 form part of a same feed network (e.g., one of the feed networks 208, 210) that is configured to provide signals having a first polarization to the antennas of the array 200.

Referring now solely to FIG. 3A, the row feed network 302 is a staged feed network. The row feed network 302 includes a plurality of x stages, where x is a positive integer, and wherein further a number of the x stages is related to the number of antennas in a row, n, by $$n=2^x. \qquad \text{(Eq. 4)}$$

In each subsequent stage of the row feed network 302, the traces of a preceding stage are split into two traces, such that at each subsequent stage a number of the traces doubles. By way of example, the row feed network 302 includes a primary row input trace 308. In a first stage of the row feed network 302, the primary row input trace 308 splits into a first trace 310 and a second trace 312. Similarly, in a second stage of the row feed network 302, each of the first trace 310 and the second trace 312 splits into a respective pair of traces, and so on until the number of traces is equal to the number of antennas in the row 300. Hence, each of the antennas of the row 300 can be provided an input signal having a first polarization by way of a common primary row input trace 308.

Referring again to FIG. 3B, the row-combining feed network 306 is similarly configured to provide an input signal having a first polarization to each of the rows of the array 200. The row-combining feed network 306 includes a primary array input trace 314. The primary array input trace 314 serves as a common input to the array for signals having a first polarization. Thus, a signal that is input to the primary array input trace 314 can drive a radiating output of each of the antennas of the array 200. Like the row feed network 302, the row-combining feed network 306 is a staged feed network. A number of stages, y, of the row-combining feed network 306 can be related to the number of rows m of the array 200 by:

$$m=2^y. \quad \text{(Eq. 5)}$$

A first stage of the row-combining feed network 306 subsequent to the primary array input trace 314 includes a first trace 316 and a second trace 318. The first trace 316 delivers input signals to a first half of the rows of the array 200, and the second trace 318 delivers input signals to a second half of the rows of the array 200. A second stage of the row-combining feed network 306 can include a pair of additional traces corresponding to each of the traces 316, 318 of the first stage of the row-combining feed network 306. For example, the second stage can include a third trace 320 and a fourth trace 322 that each branch from the first trace 316. The third trace 320 delivers input signals to a first quarter of the rows of the array 200 (i.e., a first half of the first half of the rows driven by the first trace 316). The fourth trace 322 delivers input signals to a second quarter of the rows of the array 200 (i.e., a second half of the first half of the rows driven by the first trace 316). The row-combining feed network 306 includes a plurality of m output traces (e.g., output trace 324) that each deliver input signals to a respective row of the array 200. For example, the output trace 324 can be coupled to the primary row input trace 308 of the row feed network 302 such that the output trace 324 delivers input signals to the row feed network 302.

Referring once again to FIG. 2, the feed networks 208, 210 can be configured to facilitate compact arrangement of the array 200. In an exemplary embodiment, the feed network 208 has a vertically-arranged row-combining feed network 212 aligned along a left side 214 of the array 200. The row-combining feed network 212 of the feed network 208 is arranged such that the row feed networks of the feed network 208 (i.e., that are connected to the row-combining feed network 212) are each aligned along a bottom side of a respective row of antennas. The feed network 210 has a vertically-arranged row-combining feed network 216 aligned along a right side 218 of the array 200. The row-combining feed network 216 is arranged such that the row feed networks of the feed network 210 that are connected to the row-combining feed network 216 are each arranged along a top side of a respective row of antennas in the array 200. The arrangement of the feed networks 208, 210 can facilitate spacing of antennas of the array 200 to avoid grating lobes. For example, in an embodiment wherein the array 200 is configured to transmit signals having a center frequency of 16.7 GHz, a spacing between antennas within each row can be about 10 mm and a spacing between antennas in adjacent rows can be about 13.8 mm. It is to be understood that a spacing of antennas within rows and between rows of the array 200 that inhibits grating lobes can be a function of a free space wavelength of a signal desirably transmitted or received by way of the array 200.

The feed networks 208, 210 can be configured to apply a non-uniform weighting to input signals provided to the antennas of the array 200. For example, to limit undesirable sidelobes, a Taylor weighting can be applied to the power delivered to the antennas of the array 200, such that a greatest power is emitted from antennas toward a center of the array 200 and a least power is emitted from antennas at corners of the array 200. The feed networks 208, 210 are configured to apply the non-uniform weighting to the input signals provided to the antennas of the array 200 by way of variations in the geometry of the traces of the feed networks 208, 210.

Referring once again to FIGS. 3A and 3B, the traces of the row feed network 302 and the row-combining feed network 306 can be configured to have different dimensions according to which antennas the traces deliver signals to. By way of example, and referring now to FIG. 3A, the first and second traces 310, 312 of the row feed network 302 can be configured to have substantially similar geometry so that each half of the row 300 supplied by the first and second traces 310, 312 receives a same input power. A third trace 326 and a fourth trace 328 that branch from the first trace 310 of the row feed network 302 can have different geometries in order to deliver different amounts of power to the groups of antennas served by the third trace 326 and the fourth trace 328. For example, the third trace 326 can be configured such that the third trace 326 receives less input power than the fourth trace 328, since the third trace 326 feeds antennas that are further from the center of the row 300 than antennas fed by the fourth trace 328. The differences in input power received by the third trace 326 and the fourth trace 328 can be realized by selectively configuring the geometries of the traces 326, 328 such that the impedance looking into the fourth trace 328 is better matched to the impedance looking into the first trace 310 than is the impedance looking into the third trace 326. In general, geometries of traces of the feed networks 208, 210 can be configured to deliver different amounts of input power to different antennas of the array 200 by way of differential impedance matching.

While certain exemplary feed networks 208, 210 that are configured to provide input signals to multiple antennas in the array 200 have been described herein, it is to be understood that in other embodiments, the array 200 can be configured such that each of its antennas has its own distinct input lines that are not used to feed any of the other antennas. In an exemplary embodiment, each antenna of the array 200 can be fed by a first input line connected solely to a first stripline conductor of the antenna, and by a second input line connected solely to a second stripline conductor of the antenna. In such embodiments, the first input line can provide input signals that have a linear horizontal polarization, and the second input line can provide input signals that have a linear vertical polarization. Embodiments in which each of the antennas of the array 200 have their own input lines can facilitate operation of the array 200 as a phased array.

The array 200 can be coupled to one or more waveguides to facilitate efficient coupling between the array 200 and a driver of the array, such as a signal generator. Referring now to FIGS. 4A-4D, a plurality of partial-transparency perspective views of a stripline-to-waveguide coupler 400 are illustrated. The coupler 400 is configured to allow signals propagating in a waveguide to be coupled to the feed networks 208, 210 of the array 200 by way of primary array input ports 220, 222. However, it is to be understood that the coupler 400 is suitable for use in any of various applications wherein signals are desirably coupled from a waveguide to a stripline.

Figure 4A:
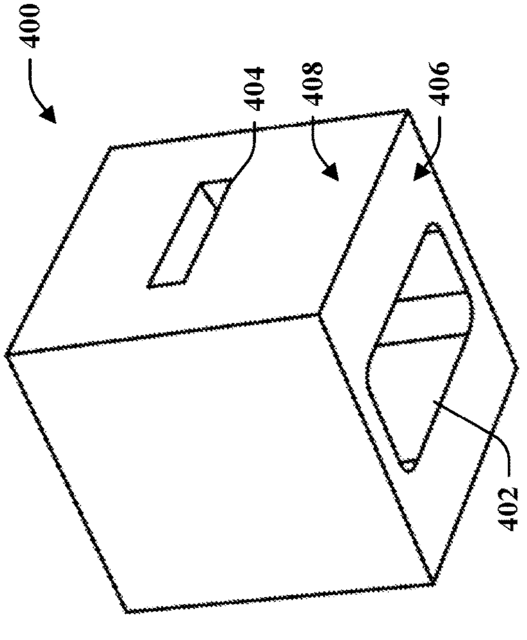
FIGS. 4A-4D are partial-transparency perspective views of an exemplary stripline-to-waveguide coupler.

Referring now specifically to FIG. 4A, a perspective view of an exterior of the coupler 400 is shown. The coupler 400 includes a waveguide 402 and a coupling slot 404. The waveguide 402 extends from a first face 406 of the coupler 400 and into an interior of the coupler 400. The waveguide 402 is configured to propagate signals (e.g., TE10 signals) that are desirably transmitted by way of a stripline. The coupling slot 404 extends from a second face 408 of the coupler 400 and into the interior of the coupler 400. The coupling slot 404 is configured to accommodate a stripline assembly.

Figure 4B:
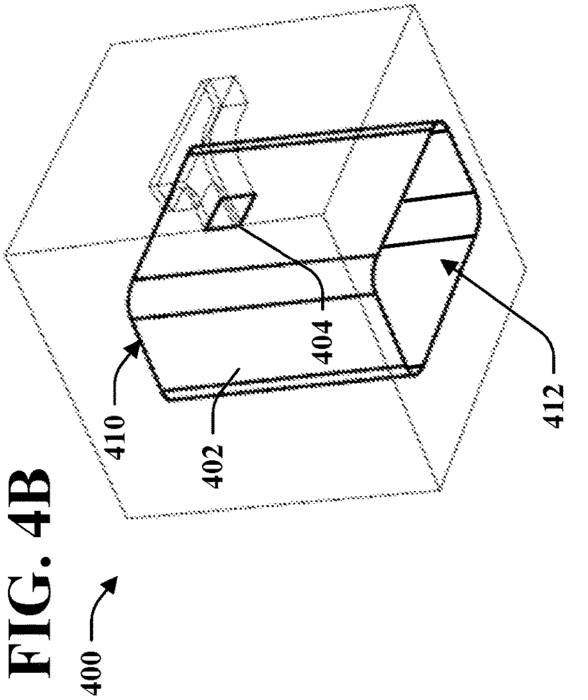

Referring now specifically to FIG. 4B, a perspective view of the coupler 400 is shown wherein an exterior of the coupler 400 is partially transparent. The perspective view of FIG. 4B illustrates certain features of the waveguide 402 and the coupling slot 404. The waveguide 402 extends into, but not through, the coupler 400. In other words, the waveguide 402 has a solid top 410. The coupling slot 404 extends through the coupler 400 and into the waveguide 402 such that a stripline assembly inserted into the coupling slot 404 can extend into the waveguide 402. An interior 412 of the waveguide 402 can be an air-filled cavity. A distance between the slot 404 and the top 410 of the waveguide can be approximately equal to $\lambda/4$ where $\lambda$ is the free-space wavelength of a signal desirably coupled between the waveguide 402 and a stripline positioned in the slot 404.

Figure 4C:
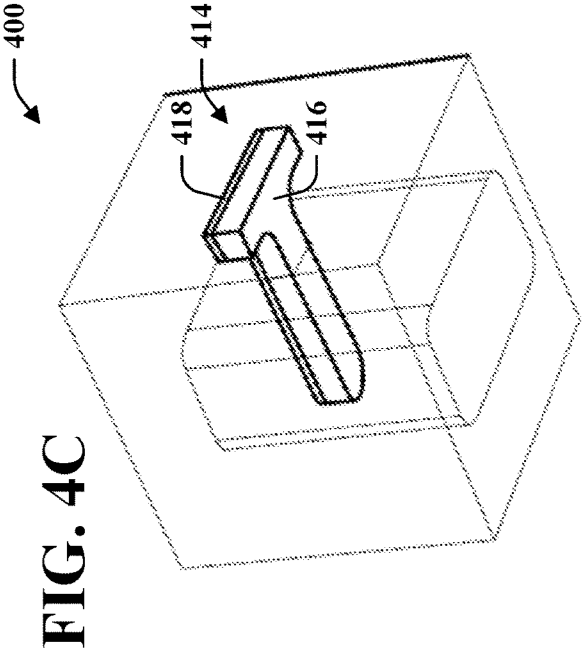
Figure 4D:
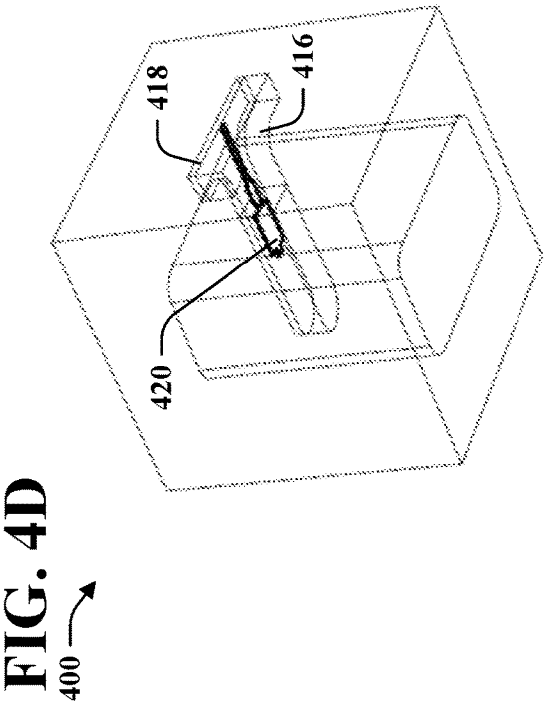

Referring now to FIG. 4C, a perspective view of the coupler 400 is illustrated, wherein the exterior of the coupler 400 and the waveguide 402 are partially transparent such that a stripline assembly 414 positioned in the coupling slot 404 is visible. The stripline assembly 414 includes a first dielectric layer 416 and a second dielectric layer 418. Referring now to FIG. 4D, a perspective view of the coupler 400 is illustrated, wherein the exterior of the coupler 400, the waveguide 402, and the dielectric layers 416, 418 of the stripline assembly 414 are partially transparent. As shown in FIG. 4D, the stripline assembly 414 further includes a stripline conductor 420 that is sandwiched between the first dielectric layer 416 and the second dielectric layer 418. Signals propagating in the waveguide 402 couple to the stripline conductor 420 and vice versa. In exemplary embodiments, the stripline conductor 420 can be connected to one of the primary array inputs 220, 222 of the feed networks 208, 210, thereby facilitating input of signals to the array 200 by way of the waveguide 402. In such embodiments, the dielectric layers 416, 418 can be the same dielectric layers used to form antennas of the array 200 (e.g., the dielectric layers 108 and 112 of the antenna 100).

Figure 5:
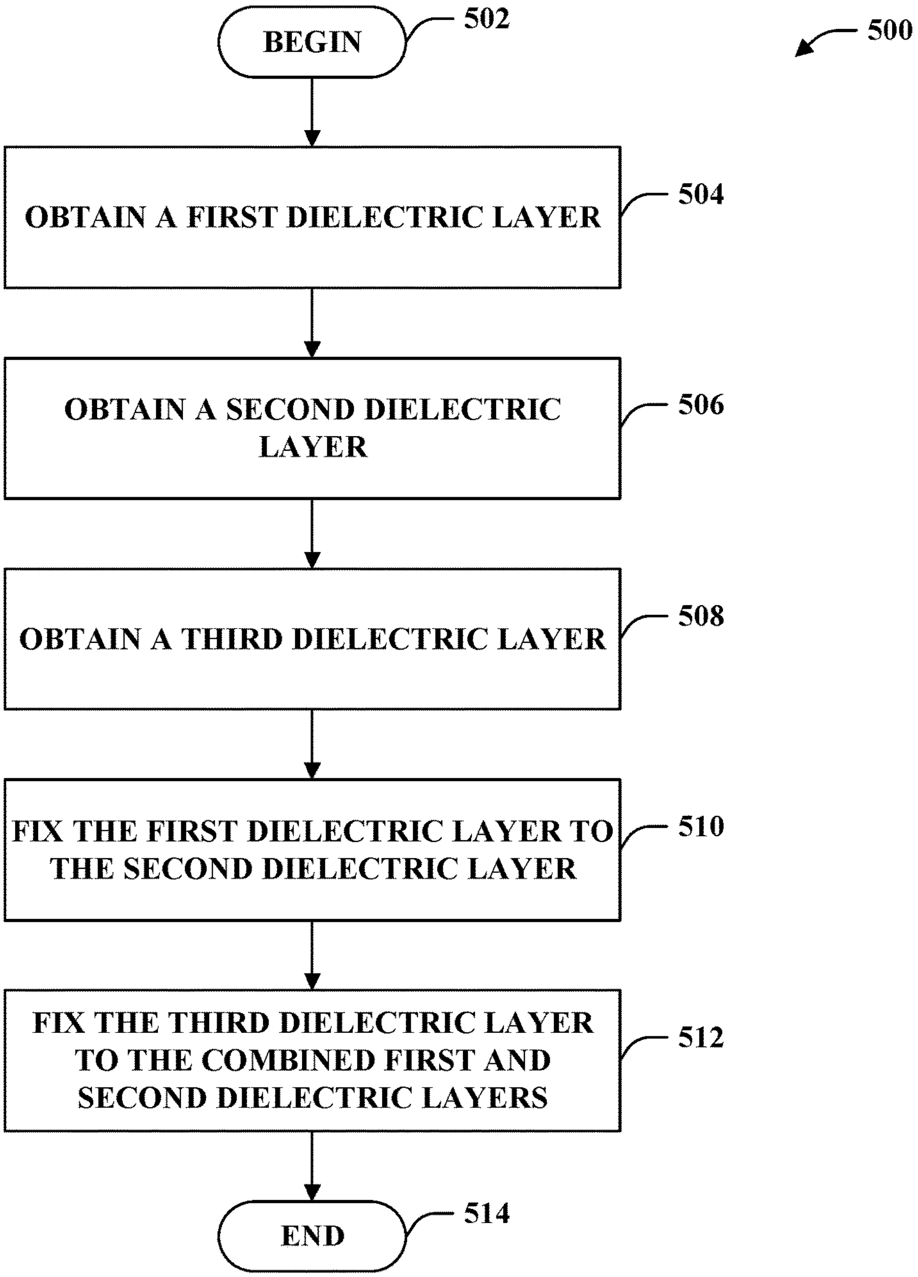
FIG. 5 is a flow diagram that illustrates an exemplary methodology for making an antenna.

FIG. 5 illustrates an exemplary methodology relating to making an antenna suitable for inclusion in a planar array. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Referring now to FIG. 5, a methodology 500 for making an antenna is illustrated. The methodology 500 begins at 502, and at 504, a first dielectric layer is obtained. The first dielectric layer has a first thickness and can have a first ground plane formed thereon. At 506, a second dielectric layer is obtained. The second dielectric layer can have a first side and a second side opposite the first side. The first side can have a stripline conductor formed thereon. The second side can have a second ground plane formed thereon. The second ground plane can include a slot (e.g., an H-slot or a linear slot) that is aligned with the stripline conductor formed on the first side of the second dielectric layer. The slot is configured such that signals propagating along the stripline conductor couple into the slot.

At 508, a third dielectric layer is obtained, wherein the third dielectric layer has a patch radiating element formed thereon. For example, the patch radiating element can be formed as part of a metallization layer applied to the third dielectric layer. At 510, the first dielectric layer is fixed to the second dielectric layer such that the first dielectric layer is positioned between the first ground plane and the stripline conductor formed on the first side of the second dielectric layer. In exemplary embodiments, the first dielectric layer can be fixed to the second dielectric layer by way of an adhesive applied between the first dielectric layer and the second dielectric layer. In various other embodiments, the first dielectric layer and the second dielectric layer can be fixed together by way of clamps, fasteners, or the like. The second dielectric layer has a second thickness that is less than the first thickness of the first dielectric layer. For example, the first thickness can be sufficiently great that propagation of signals in the stripline conductor is not adversely affected by the presence of the first ground plane, whereas the second thickness can be sufficiently small that signals propagating in the stripline conductor readily couple into the slot. At 512, the third dielectric layer is fixed to the combined first and second dielectric layers such that the third dielectric layer is positioned between the patch radiating element and the slot. The second dielectric layer is further fixed to the third dielectric layer such that the patch radiating element is aligned with the slot, so that signals coupled into the slot from the stripline conductor are subsequently coupled to the patch radiating element and radiated outward from the patch radiating element. The methodology 500 ends at 514.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. An antenna system, comprising:

a first ground plane;

a first dielectric layer, the first dielectric layer being a solid positioned over the first ground plane, the first dielectric layer having a first thickness;

a stripline conductor positioned over the first dielectric layer;

a second dielectric layer, the second dielectric layer being a solid positioned such that the stripline conductor is disposed between the first dielectric layer and the second dielectric layer, the second dielectric layer having a second thickness that is less than the first thickness;

a second stripline conductor;

a second ground plane positioned over the second dielectric layer, the second ground plane having a slot and a second slot formed therein, wherein the slot is adapted to couple energy from the stripline conductor to the slot and the second slot is adapted to couple energy from the second stripline conductor to the second slot; and a patch radiating element positioned over the slot, wherein the patch radiating element is adapted to couple energy from the slot to the patch radiating element, whereupon the patch radiating element radiates at least a portion of the energy coupled from the slot and radiates at least a portion of the energy coupled from the second slot.

2. The antenna system of claim 1, wherein the second slot is positioned such that energy couples from the second slot to the patch radiating element, whereupon the patch radiating element radiates at least a portion of the energy coupled from the second slot.

3. The antenna system of claim 1, wherein the second slot is aligned in an orthogonal direction to the first slot.

4. The antenna system of claim 1, wherein the antenna system is adapted to radiate in the Ku-band, wherein the first thickness is between 59 and 65 mil, inclusive, and the second thickness is between 19 and 21 mil, inclusive.

5. The antenna system of claim 1, wherein a signal radiated by the patch radiating element has a fractional bandwidth of at least 10%.

6. The antenna system of claim 1, wherein the first ground plane is formed as a metallization layer on the first dielectric layer.

7. The antenna system of claim 1, wherein the stripline conductor is formed as a metallization layer on a first side of the second dielectric layer, the second ground plane formed as a metallization layer on a second side of the second dielectric layer.

8. The antenna system of claim 1, further comprising a plurality of antennas, wherein the plurality of antennas includes a first antenna, the first antenna comprising the first dielectric layer, the stripline conductor, the second dielectric layer, the second ground plane, and the patch radiating element.

9. The antenna system of claim 8, wherein the plurality of antennas further includes a second antenna, the antenna system further comprising a feed network, the feed network configured such that responsive to the feed network receiving an input signal, the feed network delivers a first signal having a first power to the first antenna and delivers a second signal having a second power to the second antenna, wherein the first power is different from the second power.

10. The antenna system of claim 1, further comprising a third solid dielectric layer positioned between the second ground plane and the patch radiating element.

11. The antenna system of claim 1, wherein the slot is an H-slot that includes at least one tuning feature, a first tuning feature extending from a first straight portion of the slot toward a second straight portion of the slot that is parallel to the first straight portion.

* * * * *